(12) United States Patent
Li (10) Patent No.: US 11,494,130 B2
(45) Date of Patent: Nov. 8, 2022

(54) OPERATION DATA ACCESSING DEVICE AND ACCESSING METHOD THEREOF

(71) Applicant: Silicon Motion Technology (Hong Kong) Limited, Kowloon (HK)

(72) Inventor: TongShu Li, Kowloon (HK)

(73) Assignee: Silicon Motion Technology (Hong Kong) Limited, Kowloon (HK)

( * ) Notice: Subject to any disclaimer, the term of this patent is extended or adjusted under 35 U.S.C. 154(b) by 323 days.

(21) Appl. No.: 16/743,587

(22) Filed: Jan. 15, 2020

(65) Prior Publication Data
US 2020/0249845 A1    Aug. 6, 2020

(30) Foreign Application Priority Data

Feb. 1, 2019  (CN) .......................... 201910102306.0

(51) Int. Cl.
*G06F 3/06* (2006.01)
*G06F 9/24* (2006.01)
*H04Q 11/00* (2006.01)
*H04L 69/324* (2022.01)
*H04L 69/00* (2022.01)
*H04L 9/40* (2022.01)

(52) U.S. Cl.
CPC ............ *G06F 3/067* (2013.01); *G06F 3/0604* (2013.01); *G06F 3/0635* (2013.01); *G06F 9/24* (2013.01); *H04L 63/0281* (2013.01); *H04L 69/03* (2013.01); *H04L 69/324* (2013.01); *H04Q 11/0067* (2013.01)

(58) Field of Classification Search
CPC .......... G06F 3/067; G06F 9/24; G06F 3/0604; G06F 3/0635; H04Q 11/0067; H04L 69/324; H04L 69/03; H04L 63/0281
See application file for complete search history.

(56) References Cited

U.S. PATENT DOCUMENTS

| 9,959,073 B1* | 5/2018 | Meiri ..................... G06F 3/0647 |
| 10,684,888 B1* | 6/2020 | Sethuramalingam ........................ G06F 9/45558 |
| 2011/0047340 A1* | 2/2011 | Olson ................. G06F 11/1456 718/1 |

FOREIGN PATENT DOCUMENTS

| CN | 1811756 A | 8/2006 |
| CN | 206388319 U | 8/2017 |
| TW | 201028852 A | 8/2010 |

* cited by examiner

*Primary Examiner* — Mark A Giardino, Jr.
(74) *Attorney, Agent, or Firm* — Umberg Zipser LLP; Ryan Dean (57) ABSTRACT

The present invention disclosed an operation data accessing device comprising a non-internet protocol connection module, a storage module, and a processing module. The operation data accessing device communicates with the operation data storage device through the non-internet protocol connection module. A first logical disk and a second logical disk are established in the operation data storage device. The first logical disk stores the operation data, the second logical disk stores the mapping operation data, and the mapping operation data corresponds to the operation data of the first logical disk. The storage module stores a set of program code. The processing module calls the program code stored in the storage module and performs the operations of establishing a link logical disk that establishes a data link channel for capturing the mapping operation data when the processing module detects that the non-internet protocol connection module is enabled.

5 Claims, 5 Drawing Sheets

OPERATION DATA ACCESSING DEVICE AND ACCESSING METHOD THEREOF

CROSS REFERENCE TO RELATED APPLICATION

This application claims the priority benefit of Chinese Patent Application Serial Number 201910102306.0, filed on Feb. 1, 2019, the full disclosure of which is incorporated herein by reference.

BACKGROUND

Technical Field

The present disclosure relates to data processing for a non-internet protocol, and more particularly to an operation data accessing device and an accessing method thereof.

Related Art

With the development of Internet, the Internet data center has developed rapidly and become an indispensable part for the Internet industry. The Internet data center provides a large-scale, high-quality, secure and reliable professional server hosting, web-space leasing and wholesale network bandwidth services for Internet providers, enterprises, media and various websites.

However, lots of customers do not have professional equipment operation teams to maintain the network data center, so there is operation service providers for the needs mentioned above providing relevant services to customers. It is carried out by deploying a data collection system in the computer room of the Internet data center to store the collected data onto the portable disk manually taken out of the computer room of the Internet data center, then finding a location where it can be connected to network of the operation service provider and transferring the data to the operation service providers. The solution is labor intensive, and the disk used for data transmission may also be infected by virus and may affect the equipment or system of the computer room of the network data center. Also, the solution can only provide relevant operation analysis reports for the internet data center equipment periodically. Thus, the real-time magnitude of the operation data is also very unsatisfactory, which makes it difficult to find problems in time.

SUMMARY

In order to prevent data leakage and virus attacks, the existing internet data center is isolated from the external network, which makes it impossible to obtain operation data instantaneously. Moreover, the data transmission speed and data transmission feedback of the prior art single gatekeeper are not ideal, which greatly affects the service quality of the Internet provider. Moreover, the data transmission speed and data transmission feedback of the single gateway of conventional techniques are not ideal, which greatly affects the service quality of the internet provider. Thus, an operation data accessing device and an accessing method are proposed to deal with the issue above.

The present disclosure provides an operation data accessing device for accessing data of an operation data storage device, wherein an operation data collecting device collects operation data from a plurality of devices. The operation data collecting device transmits the plurality of operation data to the operation data storage device. The operation data accessing device comprises a non-internet protocol connection module, a storage module, and a processing module. The operation data accessing device communicates with the operation data storage device through the non-internet protocol connection module. The operation data storage device comprises a temporary storage module, a proxy management module, a proxy storage module, and a mirror module. The temporary storage module receives the plurality of operation data. A first logical disk and a second logical disk are established in the proxy storage module. The location of the storage array on the first logical disk corresponds to the location of the storage array on the second logical disk. The proxy management module configures the plurality of operation data to be stored in the first logical disk according to the storage array location. The operation data of the first logical disk generates mapping operation data via the mirror module. The second logical disk stores the mapping operation data. The mapping operation data corresponds to the operation data of the first logical disk. The storage module stores a set of program code. The processing module, which calls the program code stored in the storage module, performs the operation of establishing a link logical disk that establishes a data link channel for capturing the mapping operation data when the processing module detects that the non-internet protocol connection module is enabled.

According to one embodiment of an operation data accessing device of the present disclosure, the updating of the link logical disk may access the mapping operation data is performed according to the request instruction.

According to one embodiment of an operation data accessing device of the present disclosure, the updating of the link logical disk may access the mapping operation data is performed periodically.

According to one embodiment of an operation data accessing device of the present disclosure, the data is transmitted between the operation data accessing device and the operation data storage device via a non-internet protocol. The non-internet protocol is a storage access protocol.

According to one embodiment of an operation data accessing device of the present disclosure, the storage access protocol is an optical fiber protocol.

The present disclosure provides an operation data accessing method comprising establishing a first logical disk and a second logical disk in the operation data storage device, establishing a link logical disk in the operation data accessing device, receiving operation data and storing the operation data in the first logical disk, copying the operation data to the second logical disk when the first logical disk stores the operation data; the second logical disk stores the mapping operation data, and establishing a data link channel for capturing the mapping operation data.

According to one embodiment of an operation data accessing method of the present disclosure, the link logical disk stores the mapping operation data is performed according to the request instruction.

According to one embodiment of an operation data accessing method of the present disclosure, the link logical disk stores the mapping operation data is performed periodically.

According to one embodiment of an operation data accessing method of the present disclosure, the data is transmitted between the operation data accessing device and the operation data storage device via a non-internet protocol. The non-internet protocol is a storage access protocol.

According to one embodiment of an operation data accessing method of the present disclosure, the storage access protocol is an optical fiber protocol.

The issues or disadvantages of the prior art are improved by the operation data accessing device and the accessing method thereof. The present disclosure implements the non-internet protocol data transmission through storage devices and accessing devices on the network boundary of the customer network data center computer room, protecting the network isolation of the customer network data center computer room as well as realizing the rapid and real-time transmission of operation data, which improve the service quality of the operation and the customer experience.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include". "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the invention.

Figure 1:
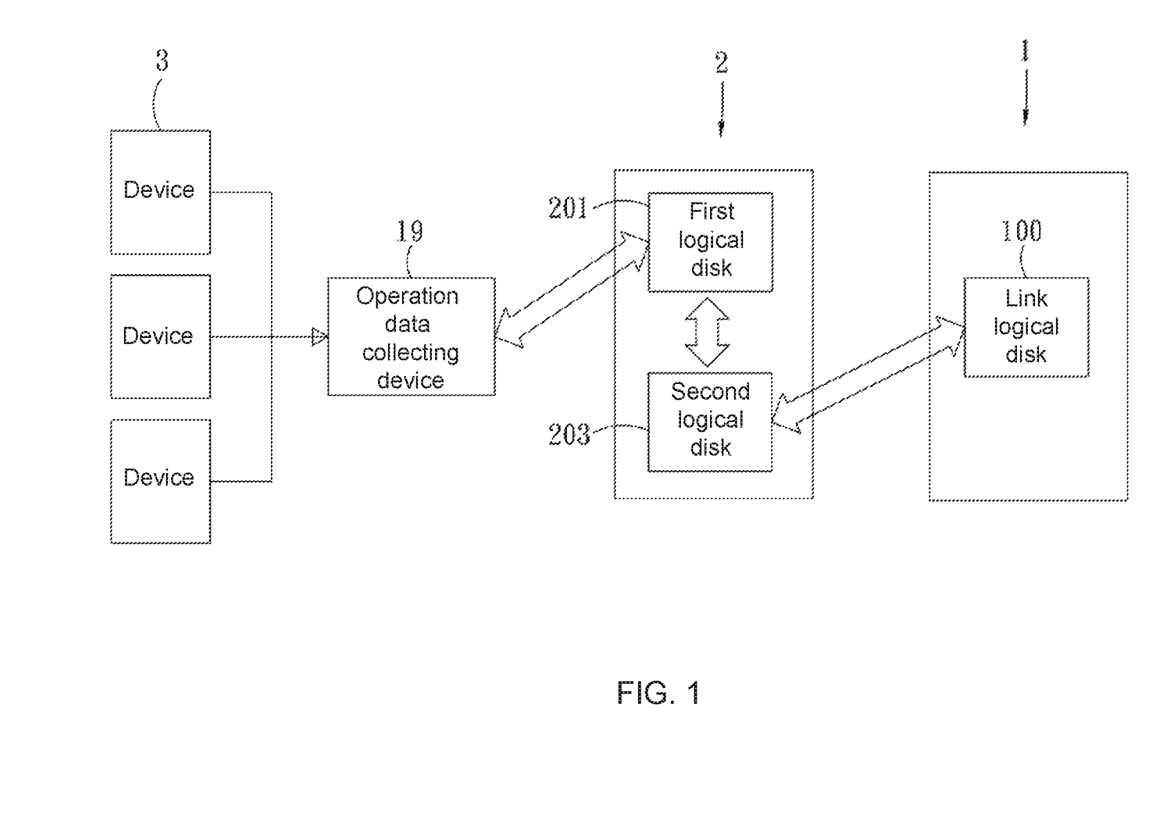
FIG. 1 is a schematic diagram of the system architecture of an operation data storage device of the present disclosure.

FIG. 1 is a schematic diagram of the system architecture of an operation data storage device of the present disclosure. The operation data storage device 2 is configured to store operation data of the device. The first logical disk 201 and the second logical disk 203 are disposed in the operation data storage device 2. The operation data collected by the operation data collection device 19 is transmitted to the operation data storage device 2 and is stored in the first logical disk 201. The second logical disk 203 stores the mapping operation data correspondingly stored in the operation data in the first logical disk 201.

In one embodiment, an operation data collecting device 19 is disposed in the computer room of the internet data center. The operation data collection device 19 communicates with a plurality of devices 3 in the computer room and collects operation data from the plurality of devices 3. There are three devices 3 shown in the figure, in order to represent the multiplicity, in which the number is not limited to this. The device 3 can be a hard disk of a computer room, a storage server, a memory device and etc. The operation data collection device 19 communicates with the operation data storage device 2 and transmits the collected data to the operation data storage device 2. The operation data collecting device 19 can perform data transmission between the operation data storage device 2 through the internet protocol. In other words, the operation data collection device 19 and the operation data storage device 2 can transmit the operation data through the internal local area network of the internet data center. It can also be done by means of non-internet protocols, such as optical fiber communication protocols, and etc.

The operation data collected by the operation data collection device 19 can be summarized into two categories: the device management information and the operation monitoring information. The device management information comprises configuration information, performance information, maintenance information, asset information, and device change records. The operation monitoring information comprises fault alarm, status monitoring, resource monitoring, and etc.

The device management information is static and is used to describe the basic attributes of the components such as central processing unit, memory, hard disk, network (physical and virtual), power supply, system board, input/output board (I/O board), power distribution board, fiber backplane, environment, board card, operating system and logical volume of the device, and each component corresponds to configuration information. The configuration information for the central processor includes quantity, location, model, main frequency, serial number, part number, manufacturer, and etc. The configuration information of memory includes quantity, location, frequency, size, individual size, serial number, part number, and etc. The configuration information of the hard disk includes the quantity, device name, type, manufacturer, serial number, part number, size, worldwide name (WWN), firmware, and etc. The configuration information of the network (physical and virtual) includes internet protocols, media access control locations, groups, names, max speed, and etc. The configuration information of the power supply includes the number of fans, serial number, part number, name and etc. The configuration information of system board includes quantity, type, manufacturer, serial number, part number, and etc. The configuration information for the I/O board (I/O board) includes quantity, name, manufacturer, serial number, part number, etc. The configuration information for the power distribution board includes quantity, manufacturer, serial number, part number, and etc. The configuration information of the fiber backplane includes the quantity, manufacturer, serial number, part number, and etc. The configuration information of the environment includes the total number of fans, CPU fan, CPU fan name, IO fan number, and IO fan name. The configuration information of board card configuration information includes quantity, type, manufacturer, serial number and part number (SCSI, FCHBA, RSC, SC cards) includes quantity, type, manufacturer, serial number and part number (SCSI, FCHBA, RSC, SC card). The configuration information of operating system includes version, number of users, group ID, group name, user ID, user group, user name, user password (ciphertext), key configuration file, software package list, hostname, management IP, test IP, service IP. IP alias, physical device name, file system name, size, mounting point, logical device name, and etc. The configuration information of logical volume includes the number of groups, group, group size, logic volume, number of logic volume, size of logic volume, software name, permission, and software version.

The static device information is a description of the device properties. Although the change of attributes of each device would not be very much frequent, there will still be changes of the static device information in the case of the entire internet data center under certain circumstances. Therefore, in the process of data collecting, the intelligent operation service system still collects static device information to ensure that the static device information is updated in time. The situation that causes the static information of the device to change includes at least the following situations. Firstly, the component is found failure and needs to be replaced when the internet data center equipment is being maintained. Secondly, the internet data center is required to expand the capabilities of existing equipment due to resource or performance requirements, such as installing extra memories, solid-state drives SSD or hard disks HDD. Thirdly, the internet data center is expanding due to business expansion, such as procurement servers, storage or network equipment, and finally, the internet data center is going to be obsoleted due to the equipment which is outdated. The above situations are included but not limited thereto.

The operation monitoring information mainly includes various information for monitoring the device, such as monitoring of host resources, network resources, and usage of storage resources. Further monitoring information will go deep into each device to collect usage status information of internal modules or components, such as CPU resources, memory resources, network interface bandwidth, network interface packet forwarding rate, storage resource usage, storage media busyness, component alarm information, system operation log, and etc. Through this series of operation monitoring information combined with the configuration management information, the operation management system can provide a variety of services of system performance warning, status warning, change warning, capacity warning, life cycle warning, and compliance check for the internet data center management personnel through the embedded analysis engine.

Figure 2:
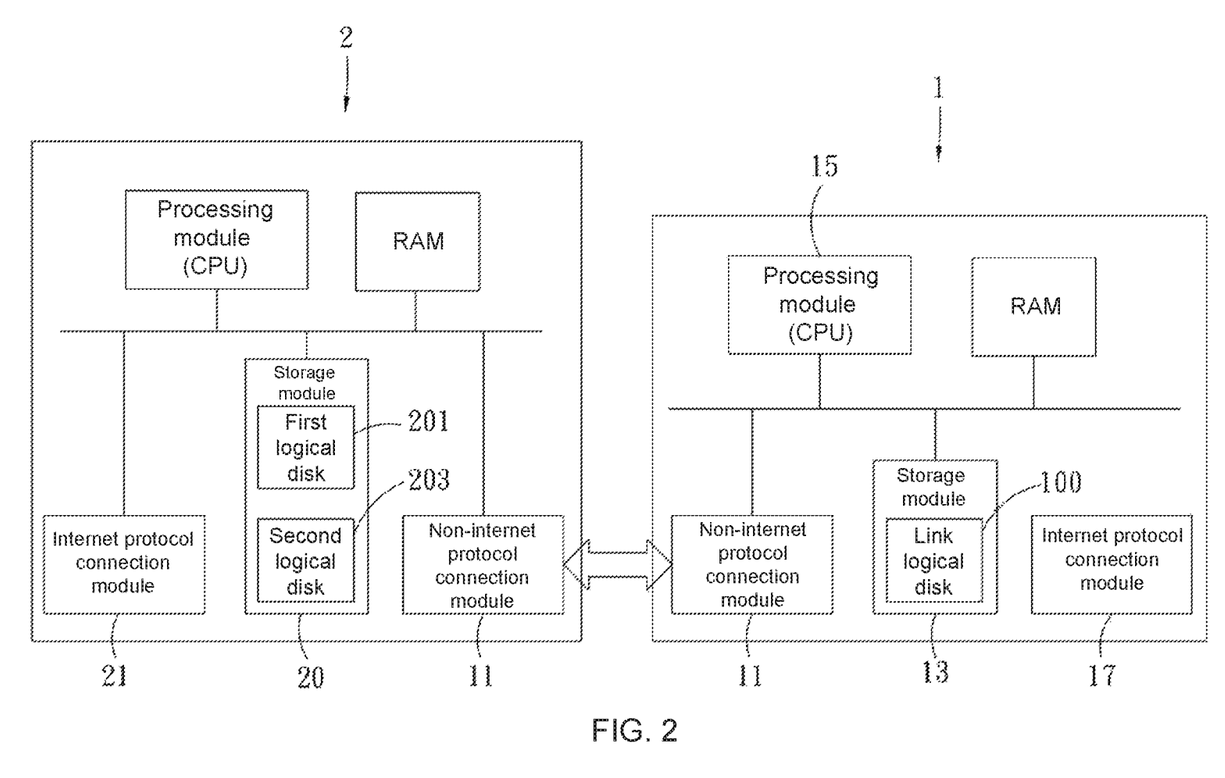
FIG. 2 is a schematic diagram of the system of an operation data storage device and an operation data accessing device of the present disclosure.
Figure 3:
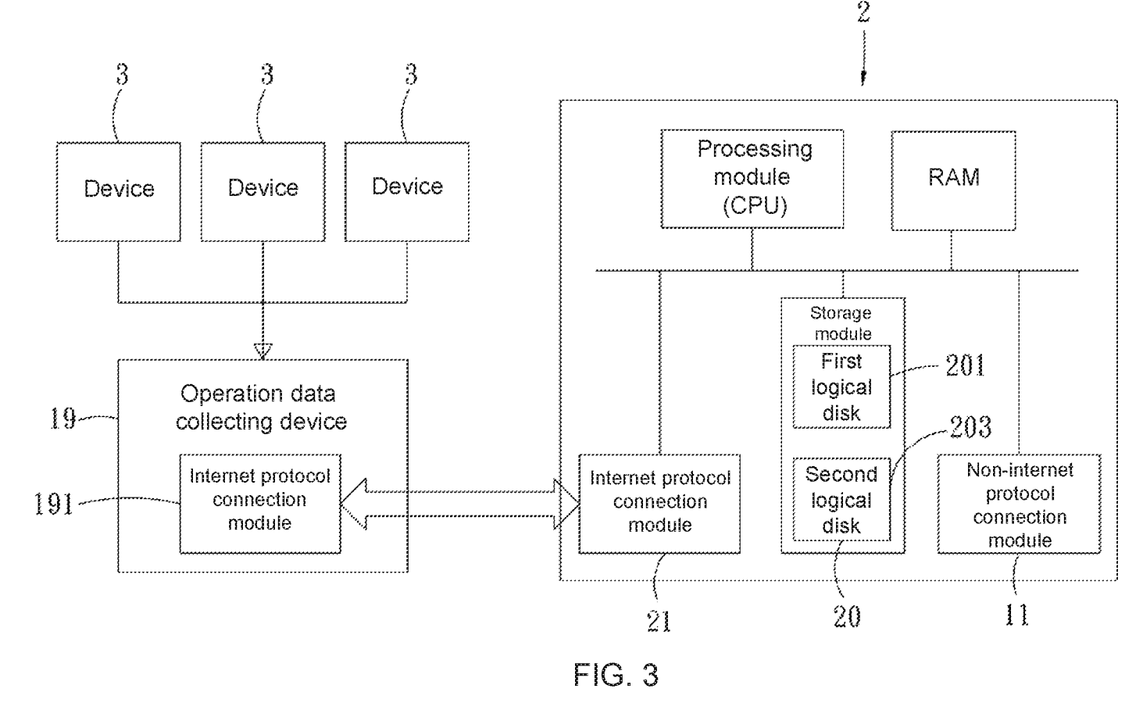
FIG. 3 is a block diagram of the system of an operation data storage device of the present disclosure.

FIG. 2 is a schematic diagram of the system of an operation data storage device and an operation data accessing device of the present disclosure, and FIG. 3 is a block diagram of the system of an operation data storage device of the present disclosure. The operation data accessing device 1 accesses the operation data in the operation data storage device 2 through the non-internet protocol data transmission channel. In the present embodiment, as well referring to FIG. 4, a schematic diagram of the system of an operation data storage device of the present disclosure, the operation data storage device 2 comprises a temporary storage module 271, a proxy management module 273, a proxy storage module 275, and a mirror module 277. The temporary storage module 271 receives a plurality of operation data. The first logical disk 201 and the second logical disk 203 are established in the proxy storage module 275. The location of the storage array on the first logical disk 201 corresponds to the location of the storage array on the second logical disk 203. The proxy management module 273 configures the plurality of operation data to be stored in the first logical disk 201 according to the storage array location. The operation data of the first logical disk 201 generates mapping operation data via the mirror module 277. The second logical disk stores the mapping operation data at the same time. The mirror module 277 copies the operation data of the first logical disk 201 into the second logical disk 203 in real-time, so that the second logical disk 203 could have mapped operation data. The operation data is identical to the mapping operation data. The disk mirroring of the mirror module 277 ensures the consistency and accuracy of the data in the first logical disk 201 and the second logical disk 203. The disk image of the mirror module 277 can be created by synchronous, semi-synchronous, asynchronous or time points according to the needs of the user.

Figure 4:
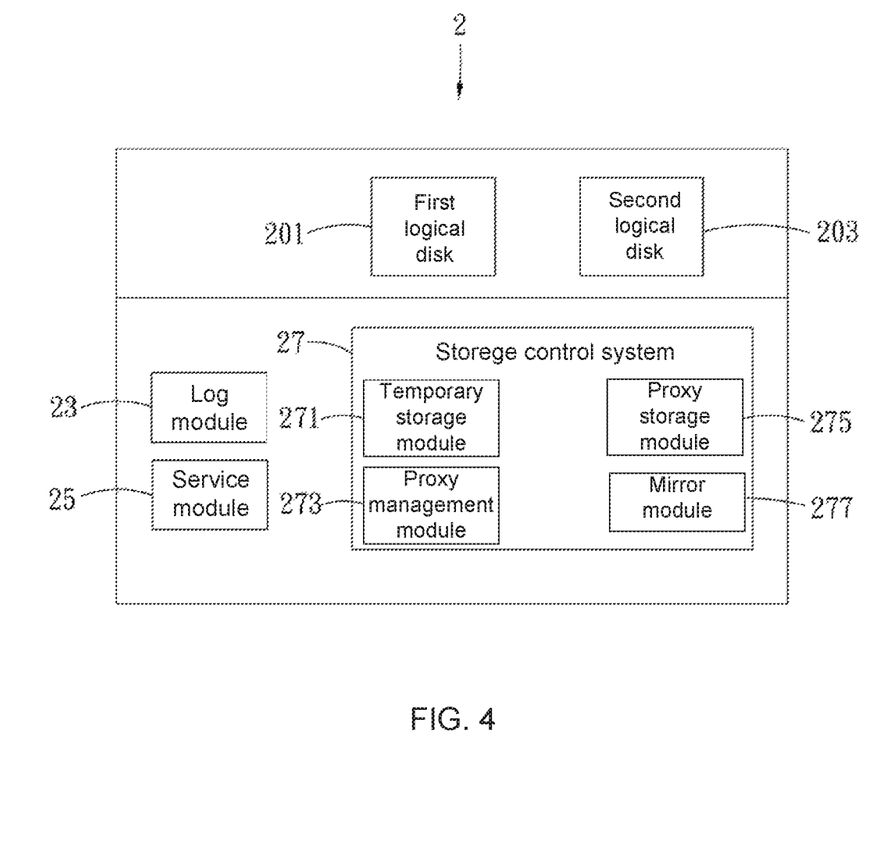
FIG. 4 is a schematic diagram of the system of an operation data storage device of the present disclosure.

In addition, if it is necessary to access or download the operation data of the first logical disk 201 (or the mapping operation data of the second logical disk 203), the proxy management module 273 accesses the operation data of the first logical disk 201 (or the mapping operation data of the second logical disk 203) in corresponding with the storage array position when storing in before.

The operation data accessing device 1 and the operation data storage device 2 communicate via a non-internet protocol. The link logical disk 100 of the operation data accessing device 1 creates a data link channel for capturing the map operation data. That is, the operation data accessing device 1 could access the mapping operation data of the second logical disk 203 by the non-internet protocol, and the link logical disk 100 displays a data link channel that can be linked to the mapping operation data of the second logical disk 203. In one embodiment, the operation data accessing device 1 and the operation data storage device 2 are disposed at the computer room of the internet data center. The operation data accessing device 1 is connected to the operation data storage device 2 by the non-internet protocol connection module 11.

In the conventional solution, a data collection system is deployed in a computer room of an internet data center, and the collected data is stored in a portable disk manually taken out of the internet data center then is transmitted to the operation service provider by the network connected to the provider. This maintenance solution above can only provide relevant operation analysis reports to the internet data center equipment periodically, so problems are difficult to find and they could not be handled in time. Another maintenance solution is to deploy a data receiving server outside the internet data center connected to the data receiving server through the gateway device, which is a unidirectional data transmission device that allows data to be transferred from the internal to the outside of the data center, but external data cannot be transmitted back to the internal. This causes the uncertainty of the integrity or correctness of data transmission, the integrity of data received, and difficulties of feedback after the operation data to be transmitted to the outside.

The technology of the present disclosure transmits data between the operation data accessing device 1 and the operation data storage device 2 via a non-internet protocol. The non-internet protocols are used for storage access protocols, and storage access protocols are also known as optical fiber protocols, that is, the FC (Fiber Channel) protocol, a fully independent network protocol avoiding data transmission methods based on IP networks. Thus, the data of the operation data storage device 2 can be internally transmitted to the operation data accessing device 1 in real-time to ensure data integrity and correctness. The operation data accessing device 1 transmits the data to the outside for maintenance through the internet protocol. The typical operating speeds are 2 Gbps, 4 Gbps, 8 Gbps, 16 Gbps, and etc., mostly used to connect computer storage devices. The present disclosure could solve the problem that the external personnel cannot confirm the integrity and correctness of the received data after receiving the data externally by the conventional technology, and to improve the issues of lack of real-time problem detection and processing caused by the maintenance scheme of data transmission transmitted manually.

The operation data accessing device 1 and the operation data storage device 2 transmit data in a uni-direction, that is, the transmission direction of the data is from the operation data storage device 2 to the operation data accessing device 1.

As shown in the figures, the operation data accessing device 1 includes a non-internet protocol connection module 11, a storage module 13 and a processing module 15. The operation data accessing device 1 accesses the operation data through the non-internet protocol connection module 11. Different from the conventional solution, it is not necessary to convert operation data into a data architecture suitable for network channel transmission, the transmission mode of the non-internet protocol connection module 11 is mainly used for accessing or storing data in which the transmission efficiency is also higher than the conventional single gateway network channel.

The storage module 13 communicates with the non-internet protocol connection module 11, and stores a set of program codes. The processing module 15 (ie, the central processing unit) calls the program code stored in the storage module 13 and performs operation of establishing a link logical disk 100 in the storage module 13 of the operation data accessing device 1 when the processing module 15 detects that the non-internet protocol connection module 21 is enabled, such as the operation data accessing device is connected to the operation data storage device 2.

The operation data storage device 2 communicates with the non-internet protocol connection module 11 of the operation data accessing device 1 by the non-internet protocol connection module 11. A storage module 20 is disposed in the operation data storage device 2, comprising a first logical disk 201 and a second logical disk 203. The first logical disk 201 stores the operation data, and the second logical disk 203 stores the mapping operation data. The mapping operation data corresponds to the operation data of the first logical disk 201. A data connection channel for capturing mapping operation data is established in the connection logical disk 100 of the operation data accessing device 1.

In this embodiment, the operation data accessing device 1 further comprises an internet protocol connection module 17 for the connection with external devices. The internet protocol connection module 17 is a protocol for packet-switched data networks. This protocol is a primary protocol at the network layer in the TCP/IP protocol suite, which transmits data based on the addresses of the source and destination hosts. The internet protocol is currently the main agreement. The operation data accessing apparatus 1 of the present embodiment can be set to be accessing restricted, that is, it can only be used for accessing data. It is not possible to tamper with the operation data provided in the logical disk 100.

Figure 5:
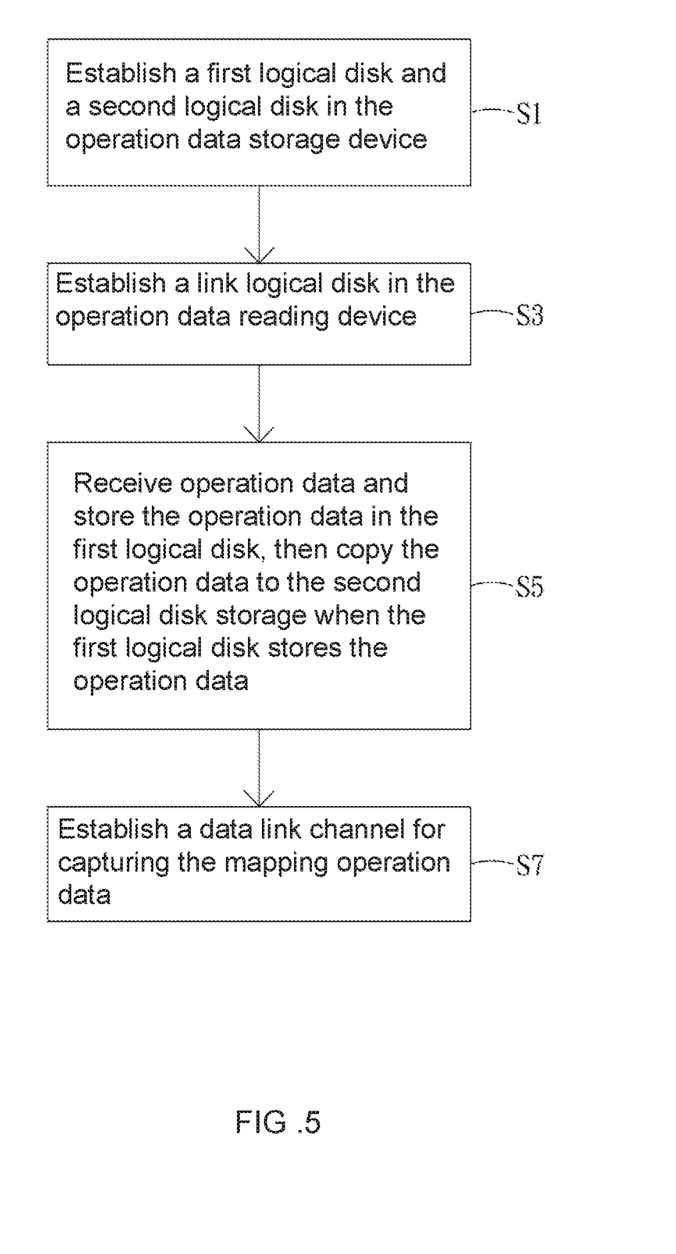
FIG. 5 is a flowchart of the accessing method of the present disclosure.

FIG. 4 is a schematic diagram of the system of an operation data storage device of the present disclosure. FIG. 5 is a flowchart of the accessing method of the present disclosure. As shown in the figures, in this embodiment, the operation data collection device 19 is configured to collect internal data of all devices in the internet data center and transmit the collected data to the operation data storage device 2.

Firstly, the first logical disk 201 and the second logical disk 203 are established in the operation data storage device 2 (step S1). The number of logical disks is increased or decreased according to user requirements, and the memory size of each logical disk is adjusted according to user requirements as well. The first logical disk 201 of the operation data storage device 2 receives and stores the internal device data transmitted by the operation data collection device 19.

Secondly, establish a link logical disk 100 in the operation data accessing device 1. A data link channel connected to the second logical disk 203 is established in the link logical disk 100 (step S3).

Thirdly, receive operation data, and storing the data in the first logical disk 201. When the first logical disk 201 stores the operation data, copy the operation data (that is, mirrored backing up) to the second logical disk 203 for storage (step S5). Thus, the relationship between internal systems of the first logical disk 201 and the second logical disk 203 is set to be as a backing-up condition. After receiving the data, the first logical disk 201 automatically maps the data to the second logical disk 203. That is, the data within the first logical disk 201 is backed up to the second logical disk 203.

Then, a data link channel for capturing operation data is established (step S7). The data link channel connecting the logical disks 100 herein is used to provide a communication space connectable to the space in the second logical disk 203, that is, the second logical disk 203 could be a source for sharing the mapping operation data, and the linking logical disk 100 could be a link channel for capturing mapping operation data. Therefore, the operation data does not occupy the disk memory space of the connected logical disk 100.

In addition, referring to FIG. 4, the operation data storage device 2 may further comprise a log module 23, or a service module 25. The log module 23 is used for related files for recording the schedule of the operation of the operation data storage device 2 and generates the related recording software for the storage of the operation data. The service module 25 is an additional function module used by the user for adding a correlation function to the operation data storage device 2.

The foregoing mapping of the first logical disk 201 to the second logical disk 203 is described as follows.

One mapping method is the technology of fault-tolerant disk arrays constructing the first logical disk 201 and the second logical disk 203 into a logical disk. After the operation data is written into the first logical disk 201, the data is copied into the second logical disk 203 by the fault-tolerant disk array technology. The operation data in the second logical disk 203 is then transmitted to the link logical disk 100 through the FC protocol. The fault-tolerant disk array technology realizes data redundancy by disk data mirroring and generates mutually backed up data on pairs of independent disks. Data can be accessed directly from mirrored replication when the raw data is in busy state, the fault-tolerant disk array technology can improve the accessing performance thereby. The fault-tolerant disk array technology is the one having higher cost per disk array unit but provides great data security and availability. When a disk fails, the system can automatically switch to the mirror disk for accessing without reorganizing.

The other method is data replication technology, which installs continuous data protection (CDP) in the data storage device 2. The data in the first logical disk 201 would be continuously backed up to the second logical disk 203, and a corresponding time interval can be set by the software for continuous data protection technology to complete the function of data backup. The data backed up by the software for continuous data protection technology enters the second logical disk 203 can continuously update the operation data in the second logical disk 203 into the linked logical disk 100 by the FC protocol in real-time, and establish an updated data link channel in the link logical disk 100.

Therefore, two mapping methods are provided in this embodiment. The first logical disk 201 is placed within the process of collecting operation data without writing the data into the linked logical disk 100 by the data collection program of the internet data center, in order to prevent the situation that there is no media for the corresponding original operation data to be stored in during the system operation when the FC channel between the operation data accessing device 1 and the operation data storage device 2 is interrupted. The FC channel could avoid the risk of the internet, and the high-throughput FC channel and real-time/asynchronous data replication technology could ensure the consistency of data transferring from internal to the outside of the internet data center.

In addition, after all the data of the first logical disk 201 is stored in the second logical disk 203, the data connection channel for capturing the operation data of the second logical disk 203 to the connection logical disk 100 is automatically established after the operation data accessing device 1 is connected to the operation data storage device 2. The updating of the link logical disk may access the mapping operation data is performed periodically. In this way, the manufacturer can upload the operation data of the internet data center computer room to a specific network location, and the operation service providers can access operation data on the specific network locations.

In summary, the present disclosure provides an operation data accessing device and a accessing method, comprising a non-internet protocol connection device, storage device, and processing device. The operation data accessing device is internally connected to the operation data storage device through a signal line of the FC (Fiber Channel) protocol. The operation data accessing device realizes data transmission function of non-internet protocol link to protect the network isolation of the customer network data center computer room as well as realizing the rapid and real-time transmission of operation data, which improve the service quality of the operation and the customer experience A person skilled in the art can understand that all or part of the above steps can be completed by program to instruct related hardware. The program can be stored in a computer-readable storage medium such as a read-only memory, a hard disk or a compact disk. The computer-readable storage medium stores one or more programs, the one or more programs including instructions, the instructions enabling the electronic device to perform the method disclosed in the embodiments when executed by an electronic device comprising a plurality of applications. In this embodiment, all or part of the steps may also be implemented by one or more integrated circuits. Correspondingly, each module unit in the foregoing embodiment may be implemented in a form of hardware or a software function module. The present disclosure is not limited to the combination of any particular form of software and hardware.

The present application is described with reference to flowcharts and/or block diagrams of methods, apparatus (systems), and computer program products according to embodiments of the present disclosure. It will be understood that each process of the flowcharts and/or block diagram and/or blocks, and the combination of the process of the flowcharts and/or block diagrams and blocks. These computer program instructions can be provided to a processor of a general-purpose computer, a special purpose computer, an embedded processor or other programmable data processing device to produce a machine, enabling instructions executed by a processor of a computer or other programmable data processing device to generate an apparatus for implementing the functions specified in one or more process of a flowchart and/or one or more block of a block diagram.

These computer program instructions may also be stored in a computer-readable memory that can direct a computer or other programmable data processing device to operate in a particular manner, causing an instruction stored in the computer-readable memory to produce an article of manufacture comprising the instruction device implementing a functions specified in one or more process of a flowchart and/or one or more block of a block diagram.

These computer program instructions can also be loaded onto a computer or other programmable data processing device such that a series of operational steps are performed on a computer or other programmable device to produce processing implemented by computer. Thus, the instructions executed on a computer or other programmable device could provide steps for implementing the functions specified in one or more process of a flowchart and/or one or more block of a block diagram.

Computer-readable media including both permanent and non-permanent, potable and non-potable media that may be implemented by any method or technology for information storage. Information can be computer-readable instructions, data architectures, modules of programs, or other data. Examples of computer storage media may be, but are not limited to, phase-change memory (PRAM), static random access memory (SRAM), dynamic random access memory (DRAM), other types of random access memory (RAM), read-only memory. (ROM), electrically erasable programmable read-only memory (EEPROM), flash memory or other memory technology, compact disk read-only memory (CD-ROM), digital versatile disk (DVD) or other optical storage, magnetic tape cartridge, magnetic tape storage or other magnetic storage device or any other non-transporting medium for information storage that can be accessed by computing devices. Computer-readable media does not comprise transitory media, such as modulated data signals and carrier waves.

It is to be understood that the term "comprises", "comprising", or any other variants thereof, is intended to encompass a non-exclusive inclusion, such that a process, method, article, or device of a series of elements not only include those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. An operation data accessing device, adapted for accessing data of an operation data storage device; wherein an operation data collecting device collects operation data from a plurality of devices; wherein the operation data collecting device transmits the operation data to the operation data storage device; the operation data accessing device comprising:

a non-internet protocol connection module, wherein the operation data accessing device communicates with the operation data storage device through the non-internet protocol connection module; the operation data storage device comprises a temporary storage module, a proxy management module, a proxy storage module, and a mirror module; wherein the temporary storage module receives the operation data; a first logical disk and a second logical disk are established in the proxy storage module; a storage array location on the first logical disk corresponds to a storage array location on the second logical disk; the proxy management module configures the operation data to be stored in the first logical disk according to the storage array location of the first logical disk; the operation data stored in the first logical disk generates mapping operation data via the mirror module; the second logical disk stores the mapping operation data; the mapping operation data corresponds to the operation data of the first logical disk;

a storage module storing a program code; and a processing module, calling the program code stored in the storage module, and performing the operation of:

establishing a link logical disk that establishes a data link channel for accessing the mapping operation data when the processing module detects that the non-internet protocol connection module is enabled.

2. The operation data accessing device according to claim 1, wherein the link logical disk updates the mapping operation data according to a request instruction.

3. The operation data accessing device according to claim 1, wherein the link logical disk updates the mapping operation data periodically.

4. The operation data accessing device according to claim 1, wherein data is transmitted between the operation data accessing device and the operation data storage device via a non-internet protocol; the non-internet protocol is a storage access protocol.

5. The operation data accessing device according to claim 4, wherein the storage access protocol is an optical fiber protocol.

* * * * *